Figure 1:
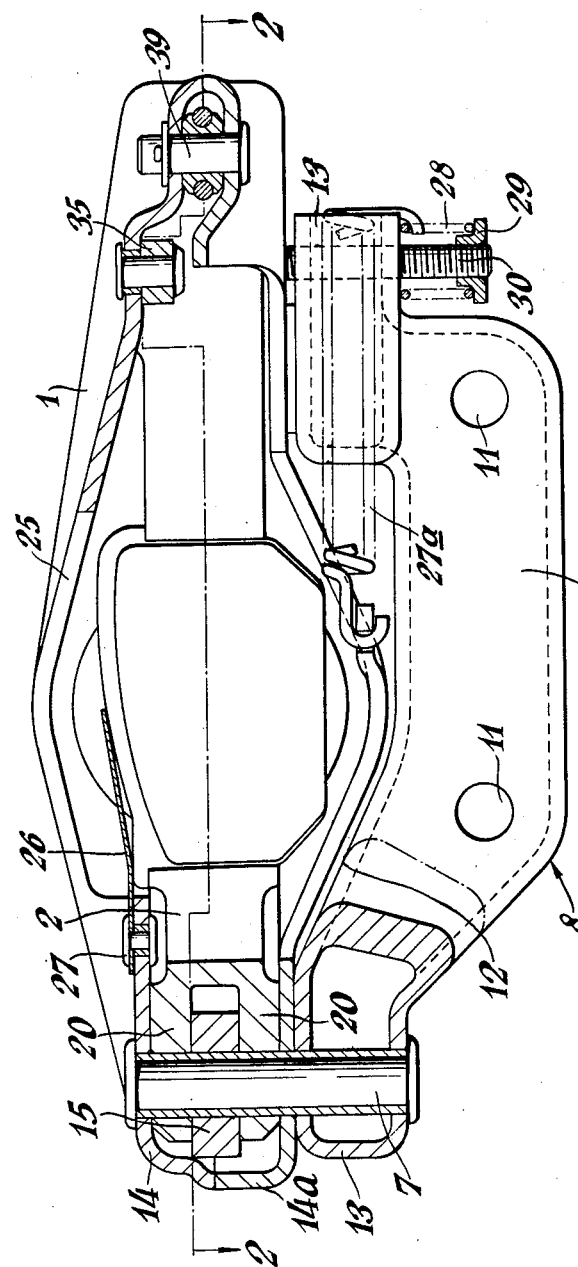

July 21, 1964

H. B. HENDERSON 3,141,527

SPOT-TYPE DISC BRAKES

Filed March 13, 1962

3 Sheets-Sheet 1

INVENTOR
Henry B. Henderson
BY
Lawrence J. Winter
ATTORNEY

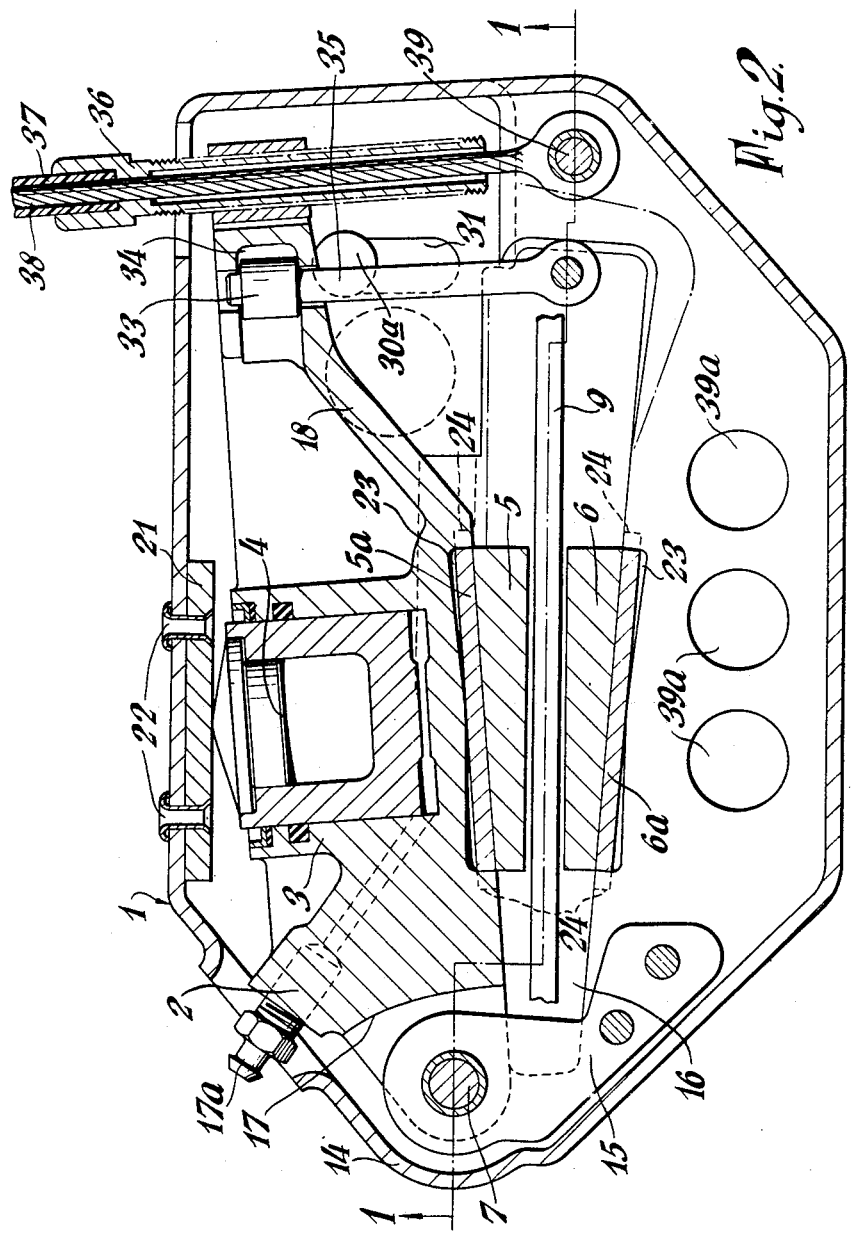

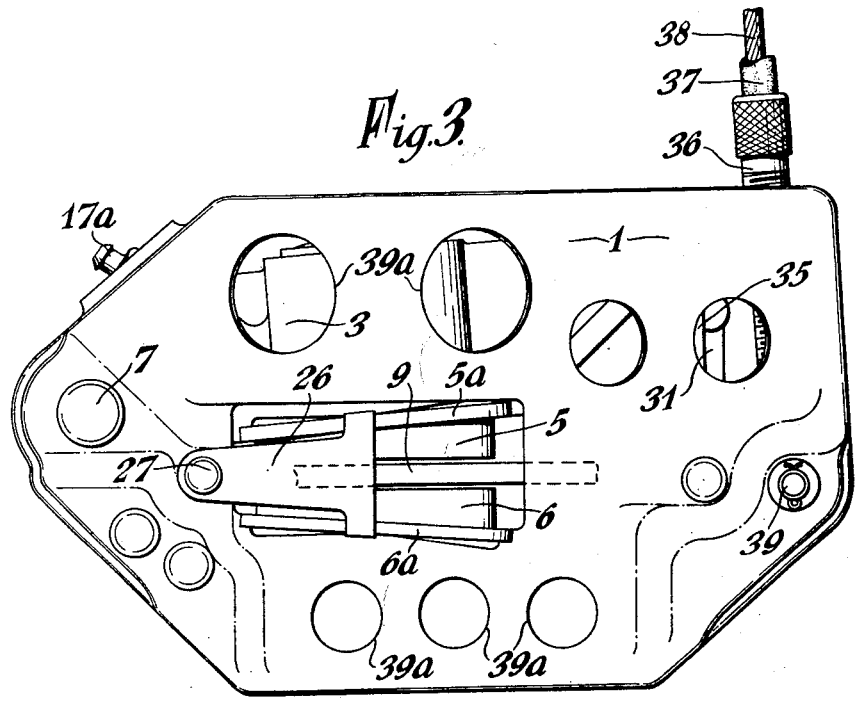
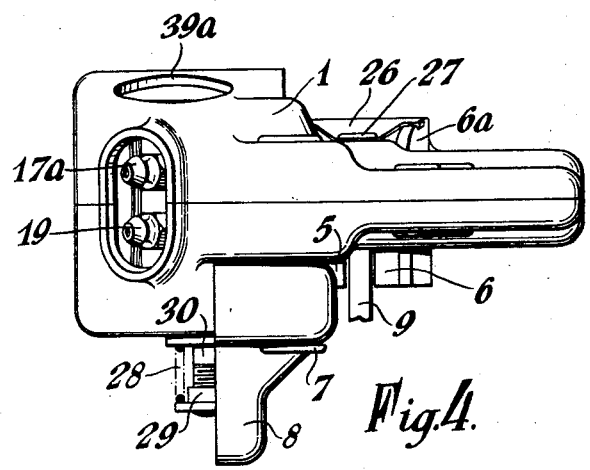

United States Patent Office 3,141,527
Patented July 21, 1964

3,141,527
SPOT-TYPE DISC BRAKES
Henry B. Henderson, Leamington Spa, England, assignor to Automotive Products Company Limited, Leamington Spa, England
Filed Mar. 13, 1962, Ser. No. 179,376
Claims priority, application Great Britain Mar. 28, 1961
9 Claims. (Cl. 188—73)

This invention relates to fluid pressure operated disc brakes of the kind in which the caliper mechanism is mounted so as to be capable of swinging movement in a plane normal to the plane of rotation of the brake disc to effect brake operation.

The object of the invention is to provide improvements in the construction of disc brake mechanism of the above kind, the disc brake also if desired being adapted for mechanical operation to permit the same to be operated as a hand brake.

According to the invention, in a disc brake of the kind above referred to the brake pads disposed on opposite sides of the brake disc are each associated with an operating member, said operating members being pivotally mounted about a common pivotal axis so as to be swingable in a plane normal to the plane of rotation of the brake disc, a wheel cylinder carried by one of said operating members having a piston operatively associated with the operating member of the other pad, the outward displacement of said piston in its cylinder resulting in a swinging movement of the operating member with which it is operatively associated to cause the brake pad associated with that operating member to contact the brake disc and swinging movement of the other operating member to cause the brake pad associated therewith also to contact the brake disc to effect braking. The operating members are pivotally mounted on a fixed support arranged on a stationary part of a wheel assembly the said fixed support being formed either as a separate component adapted for mounting on the stationary part of the wheel assembly or the same can be formed integral therewith.

The brake pads can be supported so that the drag forces arising as a result of contact of the said pads with the rotating brake disc are taken by the operating members. Alternatively the brake pads can be supported so that the said operating members are not subject to the drag forces. For example the brake pads can be supported so that the drag forces are taken wholly by the fixed support.

To adapt the brake for operation as a hand brake, the swinging movements of the support members during a brake application can be effected mechanically through for example, a "Bowden" cable, the cable core being connected to one arm and the casing to the other arm. Preferably means are provided operable automatically to control the movement of the operating members relative to one another.

A fluid pressure operated disc brake according to one embodiment of the invention will now be described by way of example by aid of the accompanying drawings in which:

FIGURE 1 is a section on the line I—I of FIGURE 2 and
FIGURE 2 is a section on the line II—II of FIGURE 1;
FIGURE 3 is a top plan view of FIGURE 1 and FIGURE 4 is a view as seen from the left of FIGURE 2.

Referring to the drawings, the disc brake shown comprises generally two operating members, referred to herein as an outer arm 1 and an inner arm 2. The inner arm 2 incorporates a wheel cylinder 3 having a piston 4 and is associated with a brake pad 5, the outer arm 3 being associated with a brake pad 6. The inner and outer arms are each pivotally mounted about one end on a common pivot pin 7 which is arranged on a fixed support 8 adapted to be secured to a fixed part of a wheel assembly. When the disc brake is assembled in position the outer and inner arms are located by the fixed support so as to be swingable in a plane normal to the plane of rotation of the brake disc 9, a fragmentary portion of which is shown in FIGURE 2, the pivot pin 7 being positioned so that the same is offset to one side of the brake disc and from the axis of rotation thereof, the brake pads 5 and 6 being disposed one on either side of the brake disc.

In the particular construction shown in the drawings the fixed support 8 has a web portion 10 provided with bolt holes 11 for bolts securing the fixed support to the stationary part of the wheel assembly the web projecting radially outwards from the wheel axis on one side of the brake disc. The web portion 10 is formed in its central region to provide a gap 12, the outer end of the web having a flange portion 13 on each side of the gap, each of which extends laterally therefrom on the side opposite to that facing the brake disc. The pivot pin 7 for the pivotal mounting of the inner and outer arms is provided on one of the flange portions adjacent the outer end thereof whereby the same is positioned as stated above, offset to one side of the brake disc 9 and from the axis of rotation thereof.

The outer arm 1 is in the form of a casing made from two dished metal plates 14 and 14a placed open side together and secured by riveting. A stiffening plate 15 is located between the plates 14 and 14a at the pivotal end of the outer arm, the plates 14, 14a and 15 being securely riveted together. The stiffening plate 15 provides a reinforcement for the pivotal end of the arm and is provided with a hole for the passage of the pivot pin 7 the opposite ends of which pass through appropriate aligned holes in the plates 14, 14a. The radially inner plate 14a is provided with an elongated aperture 16 to receive a peripheral portion of the brake disc 9 and the brake pads 5 and 6.

The inner arm 2 is formed as a casting, the wheel cylinder 3 being formed integral therewith, web portions 17 and 18 extending outwardly from either side of the cylinder forming portion, the web portion 17 having a port 17a for connecting the cylinder 3 to the fluid pressure supply of the braking system and a breather port 19. The arm 2 is disposed within the casing of the outer arm 1 so as to extend along one side of the brake disc 9 and is bifurcated at its pivotally mounted end, the pivot pin 7 passing through holes in the bifurcated end the bifurcations 20 of which are disposed one on either side of the stiffening plate 15 thus providing bearing support for both arms. The wheel cylinder 3 is arranged on the inner arm 2 so that in the assembled condition the closed end of the cylinder faces the brake disc and its open end faces a pressure plate 21 secured by rivets 22 to an interior wall portion of the casing forming the outer arm 1, the pressure plate providing an abutment surface engageable by the outer end of the piston 4.

The brake pads 5 and 6 are each provided with a metal backing plate 5a and 6a respectively each metal backing plate being locatable in a recess 23 in the appropriate arm, the side edges of the metal plates and recesses cooperating to resist the drag forces set up during a braking operation. Shoulders 24 provided at each side of the metal backing plates engage suitable ledges on the arms to locate the brake pads in the radial direction. To permit readily the insertion or removal of the brake pads the dished metal plate 14 of the casing of outer arm 1 has an aperture 25, the brake pads being restrained against outward displacement by a retaining member in the form of a blade spring 26 secured at one end by a rivet 27 to the dished plate, the rivet forming a pivot about which the blade spring 26 can be turned so as to be clear of the aperture so that brake pads can be withdrawn or inserted in the radial direction. To reduce or eliminate chatter in the brake a tension spring 27a is provided one end of which is anchored to the outer arm 1 the other end being anchored to the fixed support. Further spring loading is provided by a compression spring 28 acting between the fixed support and a collar 29 screwed onto a threaded rod 30 the rod projecting through aligned slots 31 in the flange of the fixed support and dished metal plate 14 of the outer arm 1, the end of the threaded rod remote from the collar having an enlarged head 30a which bears on the interior surface of the metal plate 14a in the region of the slot 31.

Springs 27a and 28 are anti-rattle springs. Spring 28 is arranged to hold the movable member 1 in contact with the supporting surfaces of the support 8. Spring 27a is anchored at one end to a lug on the movable member 1 and the opposite end of the spring is hooked over one of the flanged portions 13, i.e. the right-hand flange portion in FIGURE 1, the spring itself extending in the lengthwise direction of the fixed support.

In operation of the disc brake by fluid pressure, the admission of pressure fluid to the cylinder 3 causes outward movement of the piston 4 so that the outer end of the same contacts the abutment surface provided by the pressure plate with the result that the outer arm swings in a direction to bring the brake pad 6 into contact with the brake disc, the reaction set up causing the inner arm to swing in the opposite direction to bring the brake pad 5 also into contact with the brake disc whereby a braking action is obtained.

Relative pivotal movement of the outer and inner arms 1 and 2 is controlled by the provision of a bush 33 of friction material disposed in a recess 34 in the end of the inner arm 2 remote from the pivotal end thereof, a pin 35 pivotally attached by one end to the outer arm 1 extending through the bore of the bush so as to be in frictional engagement therewith.

The pin 35 and bush 33 act as a slack adjuster. As shown in FIGURE 1 the pin 35 is pivotally mounted about one end of a pivot pin carried by the movable member 1. The pin 35 extends substantially at right angles to the plane of rotation of the brake disc and has bush 33 mounted thereon adjacent its free end, Bush 33 is disposed in a recess 34 formed in the web portion 18 of the arm 2. The bush 33 is of shorter length than the width of the recess 34 to provide a clearance permitting normal brake movement with unworn pads.

The disc brake is adapted for mechanical operation so that the same can be used as a hand brake by the use of a "Bowden" cable. For this purpose the nipple 36 of the cable casing 37 is threaded externally and is screwed into a tapped hole in the end of the inner arm 2 remote from the pivotal mounting of the arm. The cable core 38 being connected as at 39 to the outer arm 1 also at the end thereof remote from the pivotal mounting of this arm. The arrangement is such that when a pull is applied to the cable core the outer arm 1 swings to cause the brake pad 6 to contact the brake disc the reaction through the cable casing 37 resulting in swinging movement of the inner arm 2 to bring the brake pad 5 also into contact with the brake disc.

In the particular construction of disc brake shown in the drawings the brake pads 5 and 6 are tapered to compensate for the angular movement of the arms and ensure that the braking surfaces thereof are parallel to the face of the brake disc when brought into contact therewith. Further the metal plates 14 and 14a are provided with holes 39a which assist in the dissipation of heat from the brake mechanism.

I claim:

1. A disc brake for a vehicle comprising a fixed support, first and second operating members pivotally mounted on said support about a common pivotal axis for swingable movement in a substantially horizontal plane about the corresponding end of said support, said first member having a flat plate portion forming a closed loop structure with a central opening therein for receiving a peripheral portion of the brake disc therethrough, a first brake pad carried by said first member and extending through said opening adapted to contact one side of said brake disc, said second member extending along one side of said opening and carrying a brake pad substantially aligned with said first mentioned brake pad and adapted to contact the opposite side of said brake disc, a wheel cylinder and piston carried by said second member, said piston being disposed in said cylinder to be displaced in a direction away from said opening and to contact said first member to swing said first member and move said first brake pad into contact with the brake disc in said opening, and to cause said second brake pad to contact the opposite side of the brake disc.

2. A disc brake according to claim 1 wherein said operating members are pivotally mounted so as to be swingable about a pivotal axis extending parallel to the plane of rotation of the brake disc and offset to one side of the brake disc, and the axis of rotation thereof.

3. A disc brake according to claim 1, wherein said brake pads are supported so that the drag forces created during a braking action are taken wholly by said operating members.

4. A disc brake according to claim 1, wherein means are provided for effecting the mechanical operation of said operating members independently of said wheel cylinder.

5. A disc brake according to claim 1, wherein the fixed support is provided with means for mounting it on a stationary part of a wheel assembly.

6. A disc brake according to claim 1, wherein the fixed support is formed integral with a stationary part of a wheel assembly.

7. A disc brake of the kind hereinbefore referred to wherein the brake pads disposed on opposite sides of the brake disc are each associated with an operating member, said operating members being pivotally mounted about a common pivotal axis so as to be swingable in a plane normal to the plane of rotation of the brake disc, one of said operating members extending along one side of the brake disc, the other operating member having a flat plate portion extending completely around the brake disc so as to lie in a chordal plane thereof, said other operating member having an aperture to receive a peripheral portion of the brake disc and the brake pads disposed on opposite sides of the brake disc, a wheel cylinder carried by said first mentioned operating member and having a piston operatively associated with the operating member of the other pad, the outward displacement of said piston in its cylinder resulting in a swinging movement of the one operating member with which it is operatively connected to cause the brake pad associated with said one operating member to contact the brake disc and swinging movement of the other operating member to cause an abutment thereon to engage the brake pad associated therewith and move said pad into contact with the brake disc to effect braking.

8. A disc brake according to claim 7 wherein the abutment surface is provided by an edge of the aperture in said other operating member.

9. A disc brake according to claim 7, wherein the wheel cylinder is arranged so that its closed end faces the brake disc, the outer end of the piston facing a further abutment surface on the other operating member.

References Cited in the file of this patent

UNITED STATES PATENTS

| | | |
|---|---|---|
| 1,995,135 | Williams et al. | Mar. 19, 1935 |
| 2,663,384 | Chamberlain | Dec. 22, 1953 |
| 2,867,295 | Butler | Jan. 6, 1959 |
| 2,948,356 | Butler | Aug. 9, 1960 |
| 2,953,221 | Lucien | Sept. 20, 1960 |

FOREIGN PATENTS

| | | |
|---|---|---|
| 231,493 | Australia | Oct. 14, 1960 |
| 1,169,939 | France | Sept. 15, 1958 |
| 1,224,569 | France | Feb. 8, 1960 |
| 1,238,036 | France | June 27, 1960 |
| 717,350 | Great Britain | Oct. 14, 1960 |
| 732,272 | Great Britain | June 22, 1955 |
| 838,505 | Great Britain | June 22, 1960 |